United States Patent
Yasuda

(10) Patent No.: US 7,397,510 B2
(45) Date of Patent: Jul. 8, 2008

(54) AUTOMATIC FOCUS ADJUSTMENT APPARATUS AND METHOD

(75) Inventor: Hitoshi Yasuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1137 days.

(21) Appl. No.: 10/637,885

(22) Filed: Aug. 8, 2003

(65) Prior Publication Data

US 2004/0036777 A1  Feb. 26, 2004

(30) Foreign Application Priority Data

Aug. 9, 2002 (JP) ............................. 2002-233687

(51) Int. Cl.
*H04N 5/232* (2006.01)
(52) U.S. Cl. ................................... 348/356
(58) Field of Classification Search ................ 348/354, 348/355, 356, 349, 353, 345
See application file for complete search history.

(56) References Cited

U.S. PATENT DOCUMENTS

| | | | | |
|---|---|---|---|---|
| 5,502,485 A | * | 3/1996 | Suzuki | ..................... 348/231.6 |
| 5,751,354 A | * | 5/1998 | Suzuki et al. | ................ 348/349 |
| 7,158,182 B2 | * | 1/2007 | Watanabe et al. | ............ 348/345 |
| 7,184,090 B2 | * | 2/2007 | Watanabe et al. | ............ 348/349 |
| 2004/0263633 A1 | * | 12/2004 | Shinohara et al. | ....... 348/207.99 |

* cited by examiner

*Primary Examiner*—Lin Ye
*Assistant Examiner*—Nicholas G Giles
(74) *Attorney, Agent, or Firm*—Morgan & Finnegan, LLP

(57) ABSTRACT

A focus adjustment apparatus, which attains focus adjustment by extracting, as a focal point voltage, a predetermined frequency component of a video signal obtained from an image sensor upon sensing an image of an object, and moving a focus adjustment member in an optical axis direction using a moving unit to maximize the focal point voltage, has a detector that detects a half-stroke state of a shutter button, and a full-stroke state which is set via the half-stroke state, and a controller that executes focus adjustment control for the half-stroke state upon detection of the half-stroke state, and selectively enables or disables the focus adjustment control for the half-stroke state in accordance with a time elapsed from detection of the half-stroke state until detection of the full-stroke state, upon detection of the full-stroke state.

6 Claims, 10 Drawing Sheets

AUTOMATIC FOCUS ADJUSTMENT APPARATUS AND METHOD

FIELD OF THE INVENTION

The present invention relates to an automatic focus adjustment apparatus and method used in various video cameras and the like.

BACKGROUND OF THE INVENTION

Auto-focus apparatuses for recent video cameras prevalently adopt a system which attains focus adjustment by detecting sharpness of a frame from a video signal obtained by photoelectrically converting an object image by an image sensing element or the like so as to obtain an AF (auto focus) evaluation value, and controlling a focus lens position so as to maximize the AF evaluation value.

As the AF evaluation value, a high-frequency component level of a video signal, which is extracted by a bandpass filter of a given frequency band, is generally used. That is, when a normal object image is sensed, the high-frequency component level increases as the focus lens position approaches an in-focus position. Hence, a point corresponding to the maximum high-frequency component level is determined as an in-focus position.

An actual video camera that can sense a still image executes AF control as follows. That is, the focus lens is controlled to smoothly maintain an in-focus position during monitoring before sensing a still image. When the user has pressed the release switch to sense a still image, the focus lens is controlled to quickly move to an in-focus position.

However, when the release switch for sensing a still image has half- and full-stroke positions, a blurred image may be recorded depending on the depression timing of the release switch by the user. In order to avoid such blurred image, the AF in-focus time is prolonged.

SUMMARY OF THE INVENTION

The present invention has been made in consideration of the above situation, and has as its object to execute optimal lens control in response to a user's input especially in sensing a still image so as to prevent a blurred image from being captured.

According to the present invention, the foregoing object is attained by providing a focus adjustment apparatus, which attains focus adjustment by extracting, as a focal point voltage, a predetermined frequency component of a video signal obtained from an image sensor upon sensing an image of an object, and moving a focus adjustment member in an optical axis direction using a moving unit to maximize the focal point voltage, comprising:

a detector that detects two input states including a first input state, and a second input state which is set via the first input state; and a controller that executes focus adjustment control for the first input state upon detection of the first input state, and selectively enables or disables the focus adjustment control for the first input state in accordance with a time elapsed from detection of the first input state until detection of the second input state, upon detection of the second input state.

According to the present invention, the foregoing object is also attained by providing a focus adjustment method, which attains focus adjustment by extracting, as a focal point voltage, a predetermined frequency component of a video signal obtained from an image sensor upon sensing an image of an object, and moving a focus adjustment member in an optical axis direction using a moving unit to maximize the focal point voltage, comprising:

monitoring a first input state of an input unit which can input two input states including the first input state, and a second input state which is set via the first input state;

executing focus adjustment control for the first input state upon detection of the first input state;

monitoring the second input state; and selectively enabling or disabling the focus adjustment control for the first input state in accordance with a time elapsed from detection of the first input state until detection of the second input state, upon detection of the second input state.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE PREFERRED EMBODIMENT

A preferred embodiment of the present invention will now be described in detail in accordance with the accompanying drawings.

Figure 1:
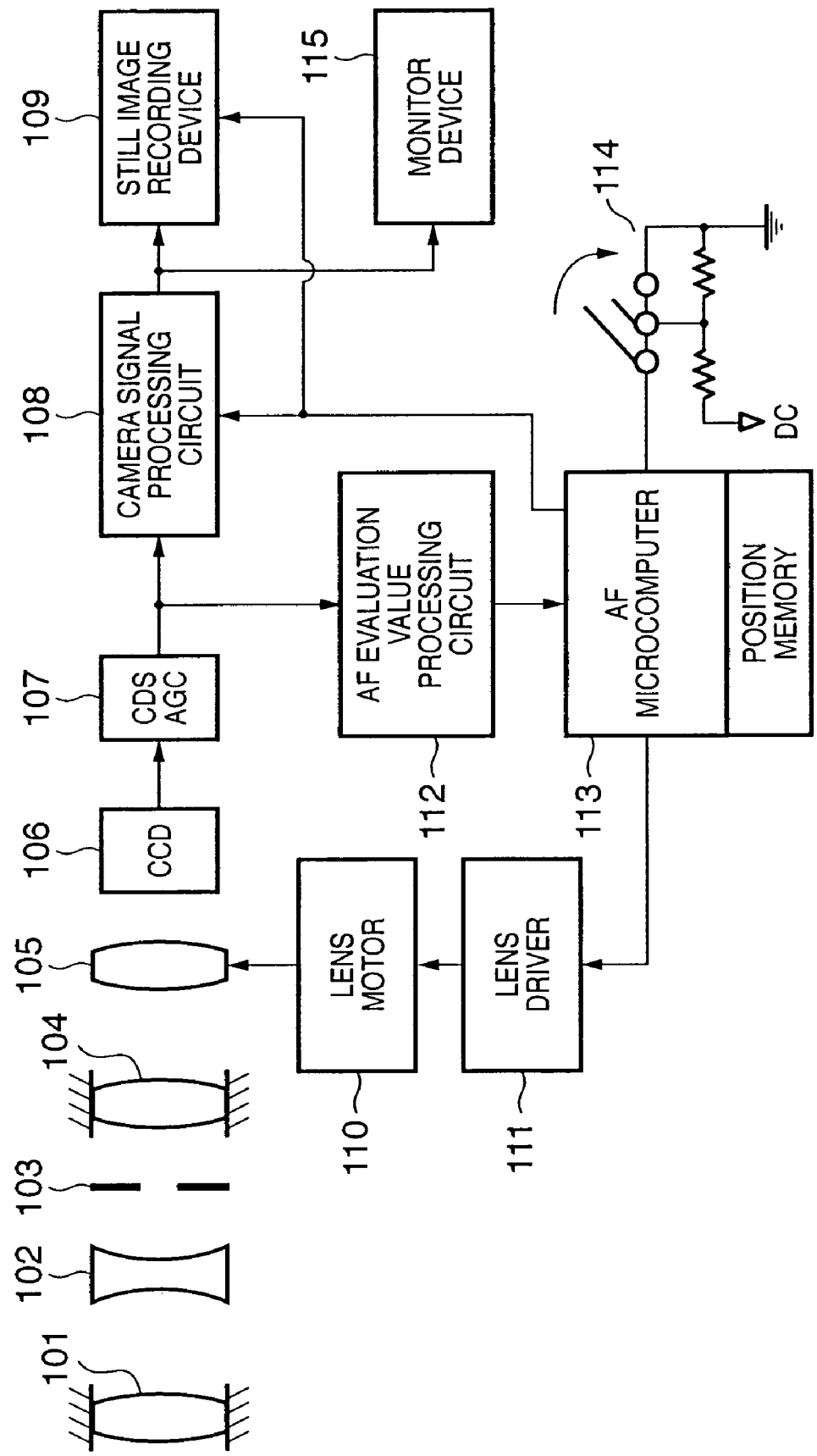
FIG. 1 is a block diagram for explaining an example of an arrangement of a video camera according to an embodiment of the present invention.

An example of the arrangement of a video camera which can sense a still image according to an embodiment of the present invention will be described first. Referring to FIG. 1, reference numeral 101 denotes a stationary first group lens;

102, a zoom lens that attains zooming; 103, an aperture; 104, a stationary second group lens; and 105, a focus compensation lens (to be referred to as a focus lens hereinafter) which has both a function of correcting movement of a focal plane upon zooming, and a focus adjustment function. Reference numeral 106 denotes an image sensing element such as a CCD or the like (to be referred to as a "CCD" hereinafter, but the present invention is not limited to the CCD); and 107, a correlated double sampling/automatic gain controller (CDS/AGC) for sampling the output from the CCD 106 and adjusting its gain. Reference numeral 108 denotes a camera signal processing circuit for processing the output signal from the CDS/AGC 107 for a signal compatible to a still image recording device 109 (to be described below). Reference numeral 109 denotes a still image recording device which uses a semiconductor memory.

Reference numeral 110 denotes a lens motor as an actuator for moving the focus lens 105; and 111, a lens driver for driving the motor 110 in accordance with a signal from an AF microcomputer 113 (to be described later). Reference numeral 112 denotes an AF evaluation value processing circuit for extracting a high-frequency component used in focus detection from the output signal of the CDS/AGC 107; and 113, an AF microcomputer for controlling the driver 111 on the basis of the output signal from the AF evaluation value processing circuit 112 to drive the focus lens 105, and switching AF control in accordance with an input from a still image release switch 114.

Reference numeral 114 denotes the still image release switch, which can detect two states (half stroke, full stroke) in accordance with the degree of depression by the user. In this case, when the user presses the release switch 114, the first state (to be referred to as a half-stroke state hereinafter) is detected first, and the second state (to be referred to as a full-stroke state hereinafter) is then detected. Reference numeral 115 denotes a monitor device which displays the output signal from the camera signal processing circuit 108, and is used to monitor a sensed scene.

Figure 2:
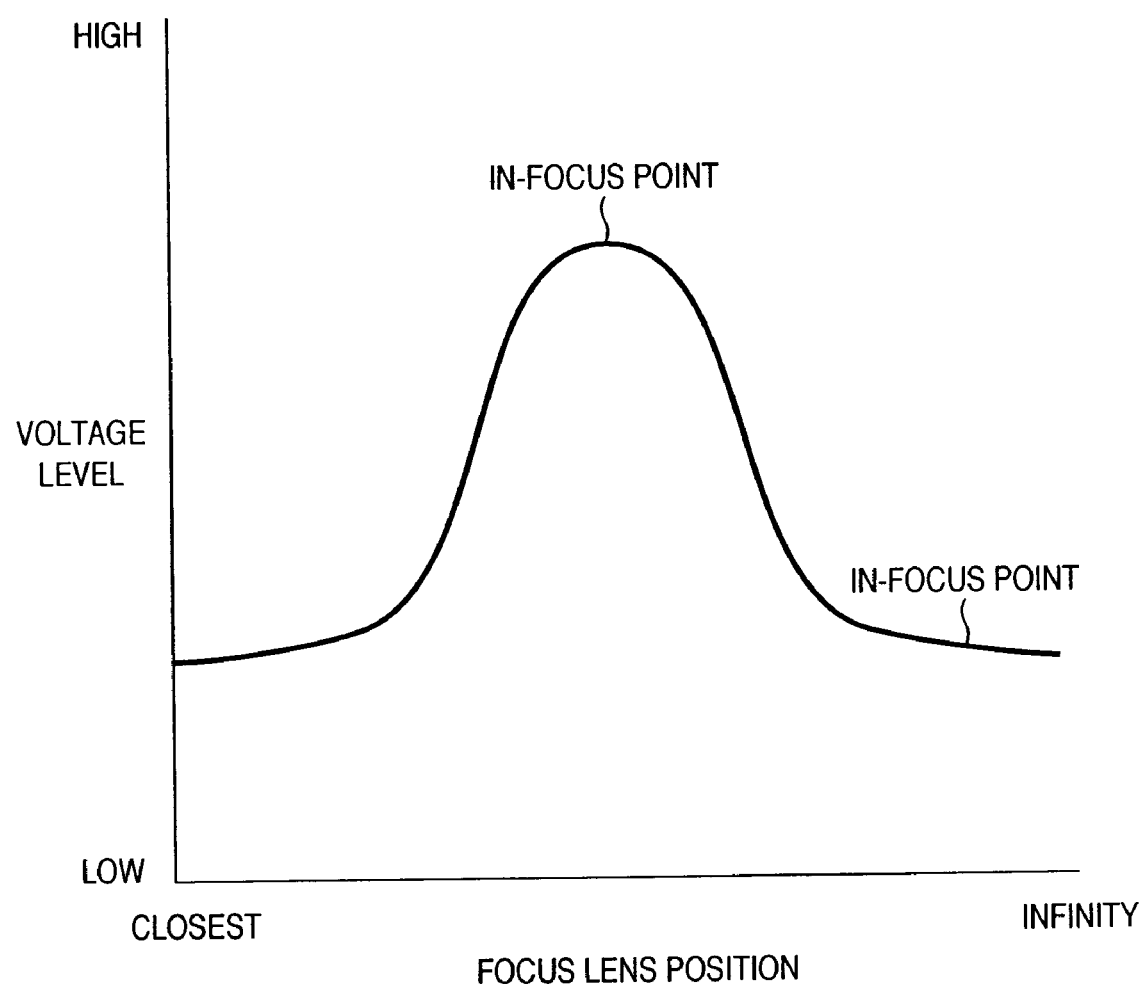
FIG. 2 is a graph showing the relationship between the focus lens position and voltage level in automatic focus adjustment according to the embodiment of the present invention.

In the camera system with the arrangement shown in FIG. 1, the AF microcomputer 113 normally executes automatic focus adjustment by moving the focus lens 105 so as to maximize the output signal level of the AF evaluation value processing circuit 112, in order to focus on a monitored image (see FIG. 2). When the half-stroke state is detected upon depression of the release switch 114, the AF microcomputer 113 executes an AF operation for still image sensing to search for an in-focus point, and controls the focus lens 105 to stop at the in-focus point. On the other hand, when the full-stroke state is detected, the AF microcomputer 113 stops the focus lens 105, and issues a recording command to the still image recording device 109. When the user wants to sense a still image of an object after focus adjustment, he or she need only wait for an in-focus state attained by the AF control while pressing the release switch 114 to its half-stroke position. On the other hand, when the user wants to sense a still image of an object immediately, he or she can press the release switch 114 to its full-stroke position.

The AF control which is done by the AF microcomputer 113 to monitor an image in this embodiment will be described in detail below with reference to FIGS. 3 to 7.

Figure 3:
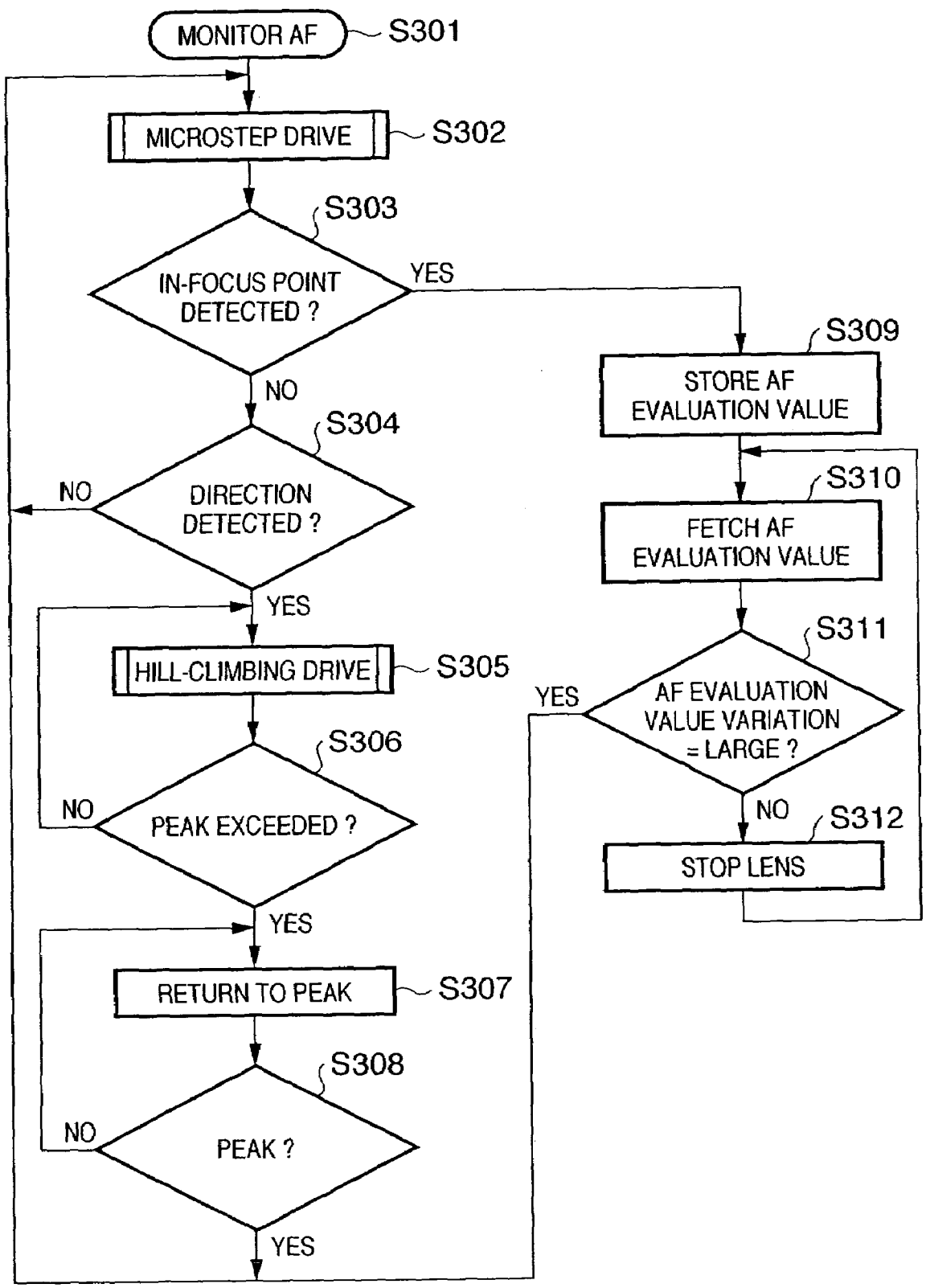
FIG. 3 is a flow chart associated with a main AF process in automatic focus adjustment according to the embodiment of the present invention.

FIG. 3 explains the overall operation of the monitor AF process. Step S301 indicates the start of the process. In step S302, a microstep drive operation is made to determine whether or not an in-focus point is reached, and to determine a direction in which an in-focus point is present if the in-focus point is not reached. A detailed operation in this step will be described later with reference to FIG. 4.

If it is determined in step S303 that the in-focus position is reached in step S302, the flow advances to step S309 to start an in-focus/re-drive determination process (to be described later). If the in-focus position is not reached in step S302, the flow advances to step S304. If it is determined in step S304 that the direction is determined in step S302, the flow advances to step S305 to perform hill-climbing drive control; otherwise, the flow returns to step S302 to continue the microstep drive operation. In step S305, the focus lens undergoes high-speed hill-climbing drive control in a direction to increase the evaluation value. A detailed operation in this case will be described later with reference to FIG. 6.

If it is determined in step S306 that the evaluation value has exceeded a peak in step S305, the flow advances to step S307; otherwise, the flow returns to step S305 to continue the hill-climbing drive operation. In step S307, the focus lens is returned to the focus lens position corresponding to the peak evaluation value during the hill-climbing drive operation. If it is determined in step S308 that the focus lens is returned to the focus lens position corresponding to the peak evaluation value in step S307, the flow returns to step S302 to execute the microstep drive operation again. If it is determined in step S308 the focus lens is not returned to the focus lens position corresponding to the peak evaluation value in step S307, the flow returns to step S307 to continue the operation for returning the lens to the peak position.

The in-focus/re-drive determination process which starts in step S309 will be described below. In step S309, the AF evaluation value at the in-focus position fetched during the microstep drive operation in step S302 is stored, as will be described later. In step S310, the latest AF evaluation value is fetched. In step S311, the AF evaluation value stored in step S309 is compared with the latest AF evaluation value fetched in step S310 to see if a variation of the AF evaluation value is large. If the AF evaluation value varies largely, it is determined that the focal point position has changed due to a change in object position, a change in object to be sensed, or the like. Hence, the flow returns to step S302 to restart the microstep drive operation. If the AF evaluation value does not vary, the flow advances to step S312. In step S312, the focus lens 105 is stopped, and the flow returns to step S310 to continue the in-focus/re-drive determination process.

Figure 4:
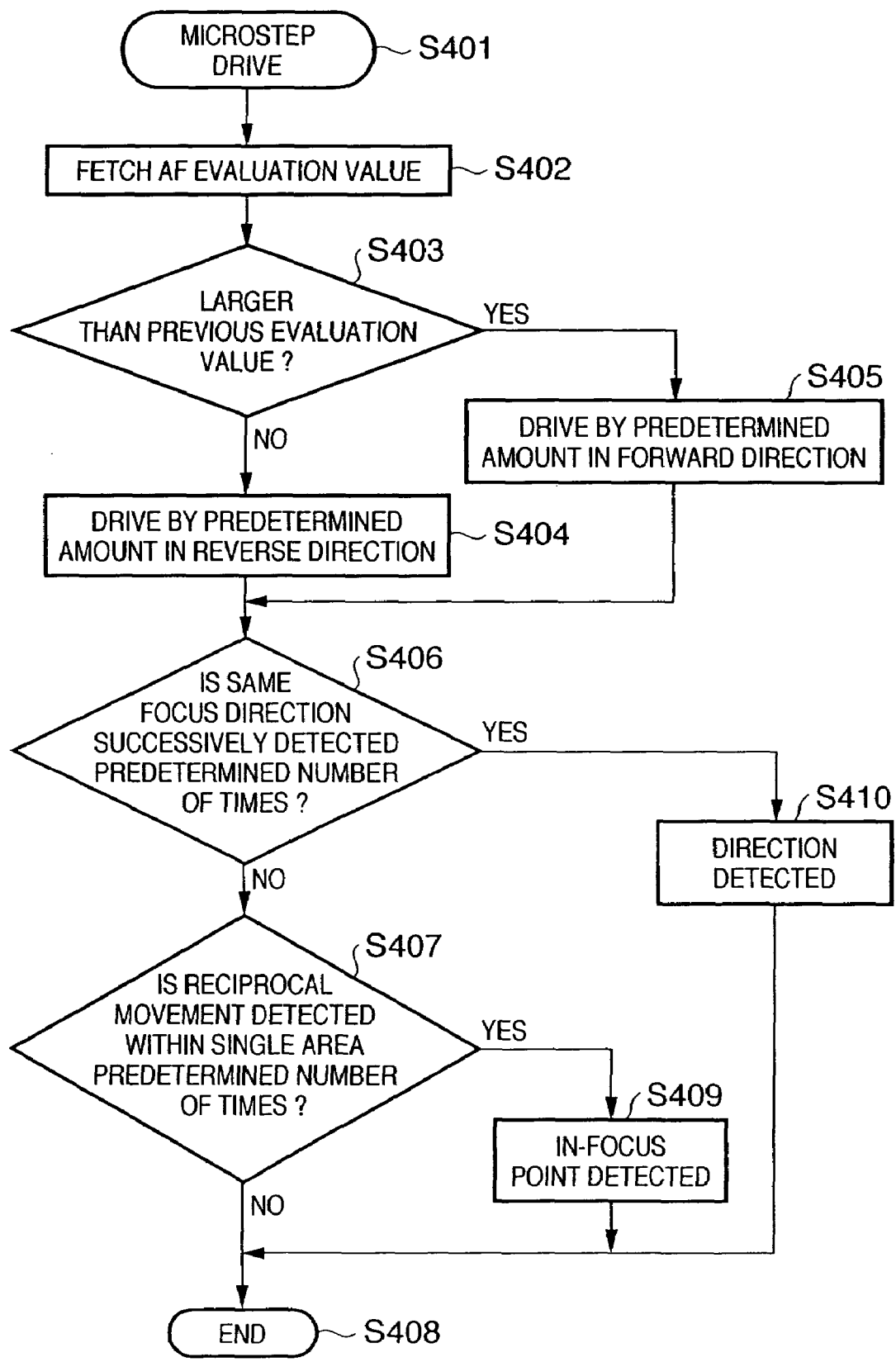
FIG. 4 is a flow chart associated with a microstep drive operation in automatic focus adjustment according to the embodiment of the present invention.

The microstep drive operation will be described below with reference to FIG. 4. Step S401 indicates the start of the process. In step S402, the AF evaluation value is fetched from the AF evaluation value processing circuit 112. If it is determined in step S403 that the evaluation value fetched in step S402 is smaller than the previous evaluation value, the flow advances to step S404; otherwise, the flow advances to step S405. In step S404, the focus lens 105 is driven by a predetermined amount in a direction opposite to the previous drive operation. On the other hand, in step S405 the focus lens 105 is driven by a predetermined amount in the same direction as the previous drive operation. If it is determined in step S406 that the same drive direction of the focus lens 105 is successively detected a predetermined number of times, the flow advances to step S410; otherwise, the flow advances to step S407.

It is checked in step S407 if reciprocal movement of the focus lens is repeated within a given area a predetermined number of times. If reciprocal movement is repeated, the flow advances to step S409; otherwise, the flow advances to step S408 to end the current process. In this case, in the aforementioned process shown in FIG. 3, since NO in step S303 and YES in step S304, the flow advances to step S305 to execute the hill-climbing drive operation. On the other hand, it is determined in step S409 that an in-focus point is detected, and the process ends. In this case, in the aforementioned process shown in FIG. 3, since YES in step S303, the flow advances to step S309 and subsequent steps to execute the in-focus/re-drive determination process.

Figure 5:
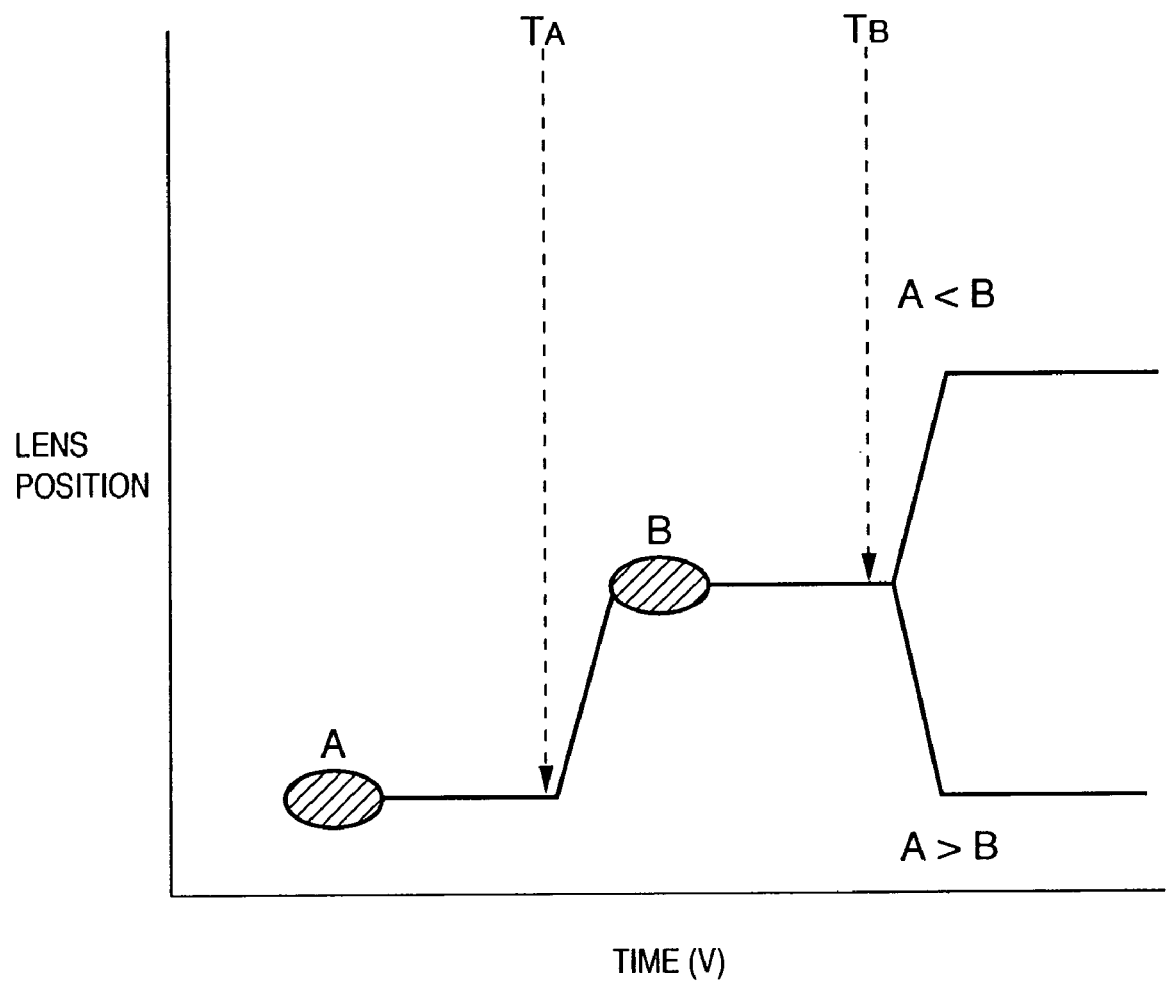
FIG. 5 is a graph showing an elapsed time of the focus lens operation in automatic focus adjustment according to the embodiment of the present invention.

FIG. 5 shows a lapse of time of the aforementioned focus lens operation. Evaluation value A corresponding to a change accumulated on the CCD during a period A is fetched at time $T_A$, and evaluation value B corresponding to a charge accumulated on the CCD during a period B is fetched at time $T_B$. At time $T_B$, evaluation values A and B are compared. If A<B, the focus lens 105 is driven in the same direction as the previous focus lens drive direction; if A>B, the focus lens 105 is driven in the opposite direction.

Figure 6:
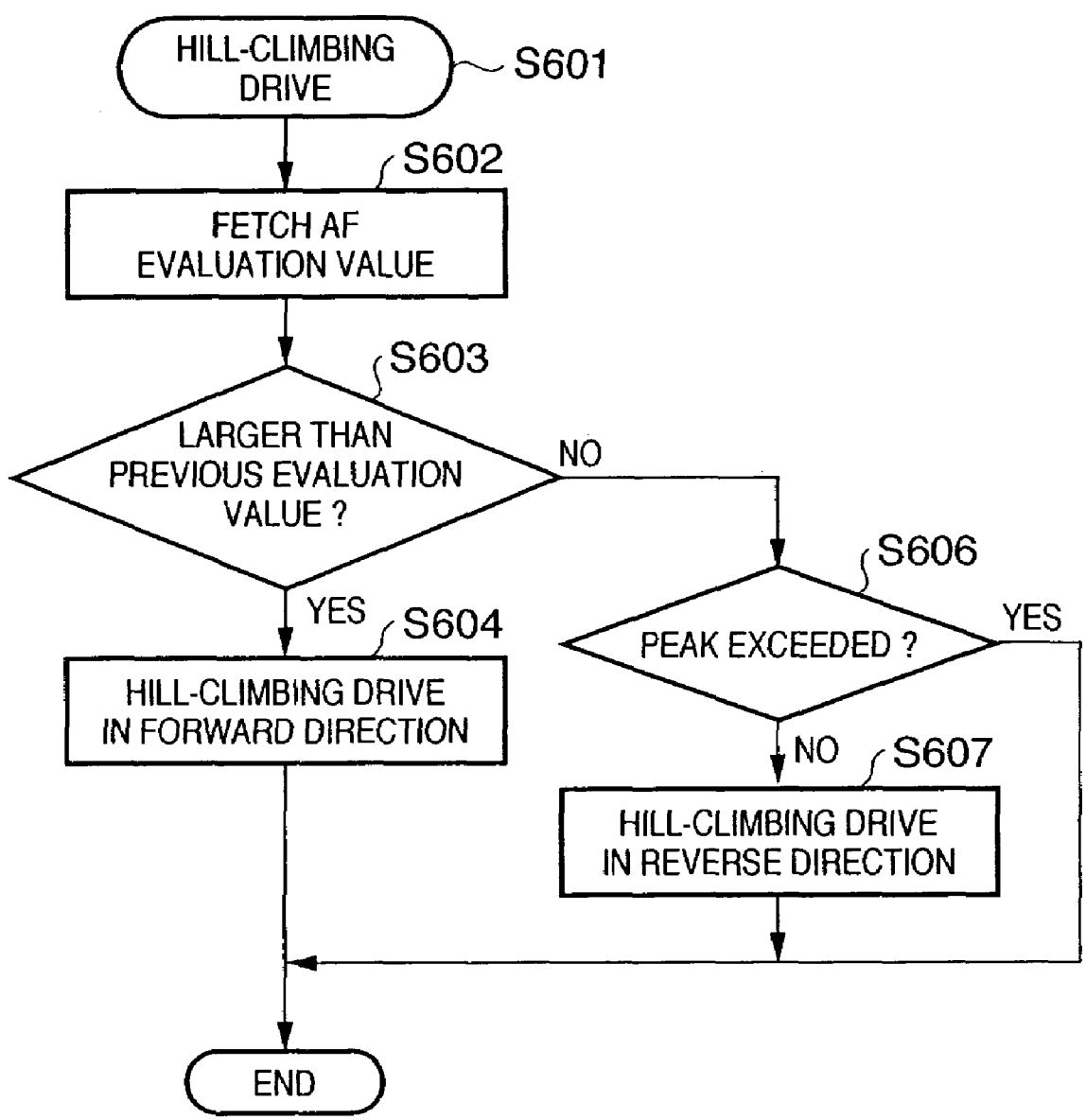
FIG. 6 is a flow chart associated with a hill-climbing operation in automatic focus adjustment according to the embodiment of the present invention.

The hill-climbing drive operation will be described below using FIG. 6. Step S601 indicates the start of the process. In step S602, the AF evaluation value is fetched from the AF evaluation value processing circuit 112. If it is determined in step S603 that the evaluation value fetched in step S602 is larger than the previous evaluation value, the flow advances to step S604; otherwise, the flow advances to step S606. In step S604, the focus lens 105 is driven by a predetermined amount at a predetermined speed in the same direction as the previous drive operation, and the current process ends. The flow then advances to step S306 in FIG. 3. In this case, since NO in step S306, the flow returns to step S305 to repeat the process in FIG. 6.

On the other hand, if it is determined in step S606 that the evaluation value is not decreased after a peak, the flow advances to step S607; otherwise, the process ends, and the flow advances to step S306 in FIG. 3. In this case, since YES in step S306, the flow advances to step S307. In step S607, the focus lens 105 is driven at a predetermined speed in a direction opposite to the previous drive operation, and the current process ends. Then, the flow advances to step S306 in FIG. 3. In this case, since NO in step S306, the flow returns to step S305 to repeat the process in FIG. 6.

Figure 7:
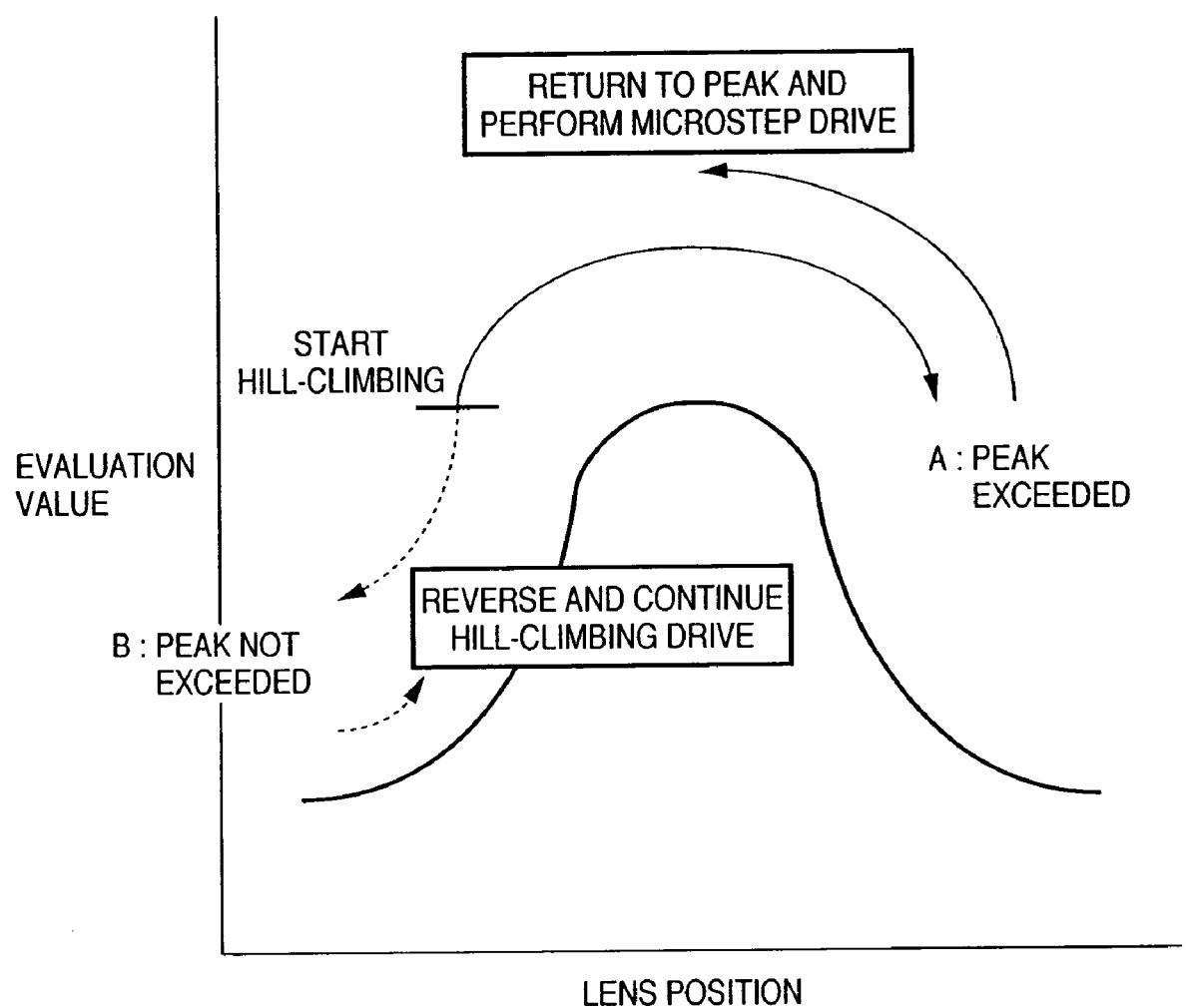
FIG. 7 is a graph showing the relationship between the focus lens position and evaluation value in automatic focus adjustment according to the embodiment of the present invention.

The focus lens operation determined in step S606 above will be described below with reference to FIG. 7. In this case, since the evaluation value is decreased at A after passing a peak (YES in step S606), it is determined that an in-focus point is found, and the hill-climbing drive operation ends. After the focus lens 105 is returned to the peak position of the AF evaluation value in steps S307 and S308, the flow returns to step S302 to start the microstep drive operation. On the other hand, since the evaluation value is decreased at B without passing any peak (NO in step S606), it is determined that the lens is driven in a wrong direction, and the drive direction is reversed, thus continuing the hill-climbing drive operation.

As described above, the focus lens 105 is moved while repeating in-focus/re-drive determination→microstep drive→hill-climbing drive microstep drive→in-focus/re-drive determination. The AF microcomputer 113 of the camera controls to always maximize the AF evaluation value, thereby maintaining an in-focus state of a monitor image.

On the other hand, according to an example of an AF operation in sensing a still image, the focus lens 105 is either stopped at that position or stopped at a peak position after a search for the in-focus position, in accordance with the operation state of the release switch 114 for sensing a still image. This general operation example will be described below with reference to FIG. 8. This process is also executed by the AF microcomputer 113. Step S801 indicates the start of the process. In step S802, the aforementioned monitor AF process is executed.

In step S803, the release switch 114 is monitored. If the release switch 114 has been pressed to its full-stroke position, the flow jumps to step S808 and subsequent steps. In step S808, the focus lens 105 is stopped at the current position, thus ending the AF process. If the release switch 114 has not been pressed to its full-stroke position, the flow advances to step S804. It is checked in step S804 if the release switch 114 has been pressed to its half-stroke position. If the release switch 114 has been pressed to its half-stroke position, the flow advances to step S805. It is checked in step S805 if a predetermined period of time has elapsed at the half-stroke position (whether the user really wants to hold the release switch at its half-stroke position or the half-stroke state is detected on the way to the full-stroke position). If the predetermined period of time has elapsed, the flow advances to step S806 to execute a still image AF process. On the other hand, if the release switch has not been pressed to its half-stroke position or the predetermined period of time has not elapsed, the flow returns to step S802 to continue the monitor AF process. It is checked in step S807 if an in-focus point is detected in the still image AF process. If an in-focus point is detected, the flow advances to step S808 to stop the AF control, thus ending the process.

Figure 8:
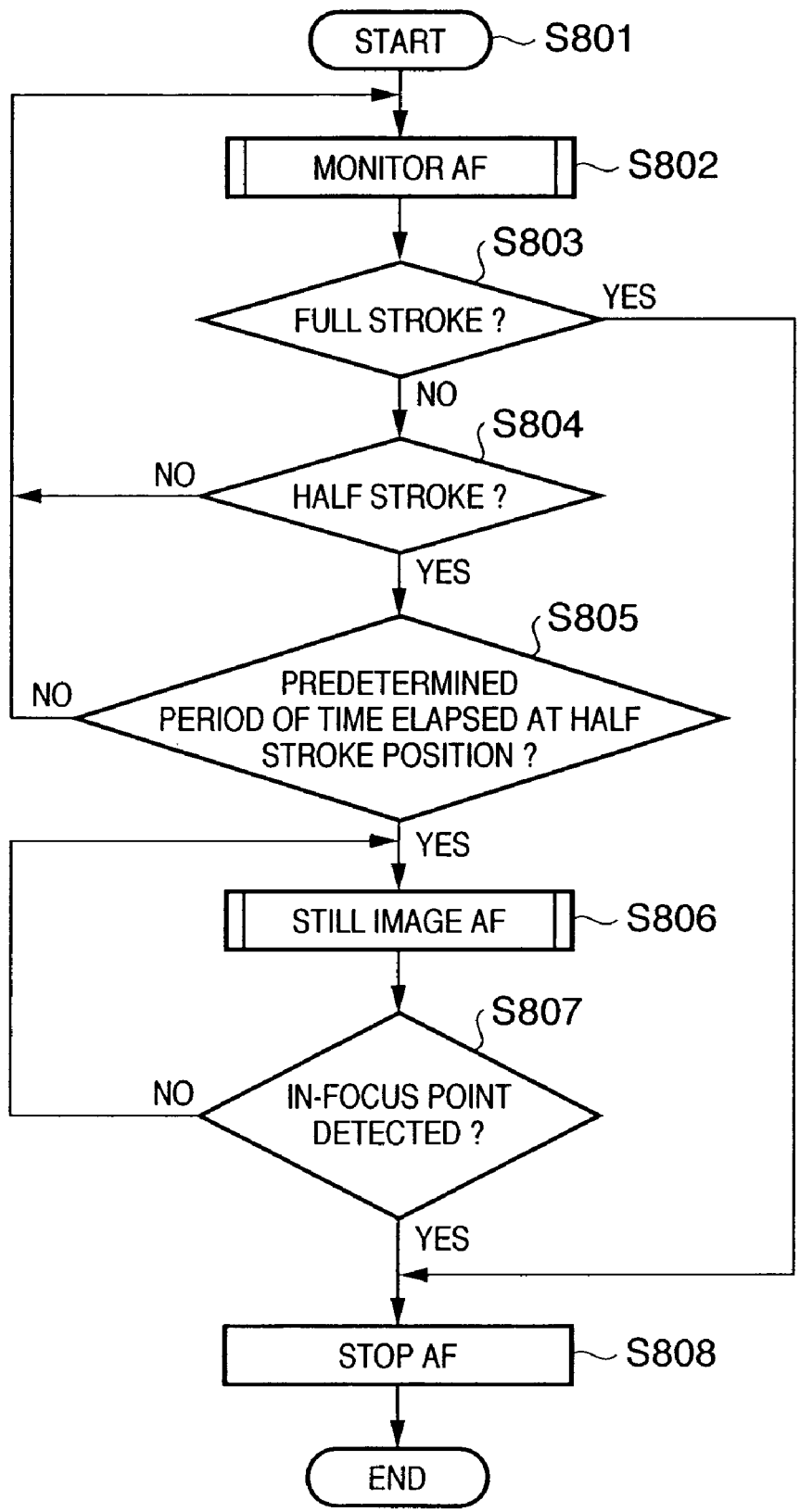
FIG. 8 is a flow chart associated with a general AF operation in sensing a still image.
Figure 9:
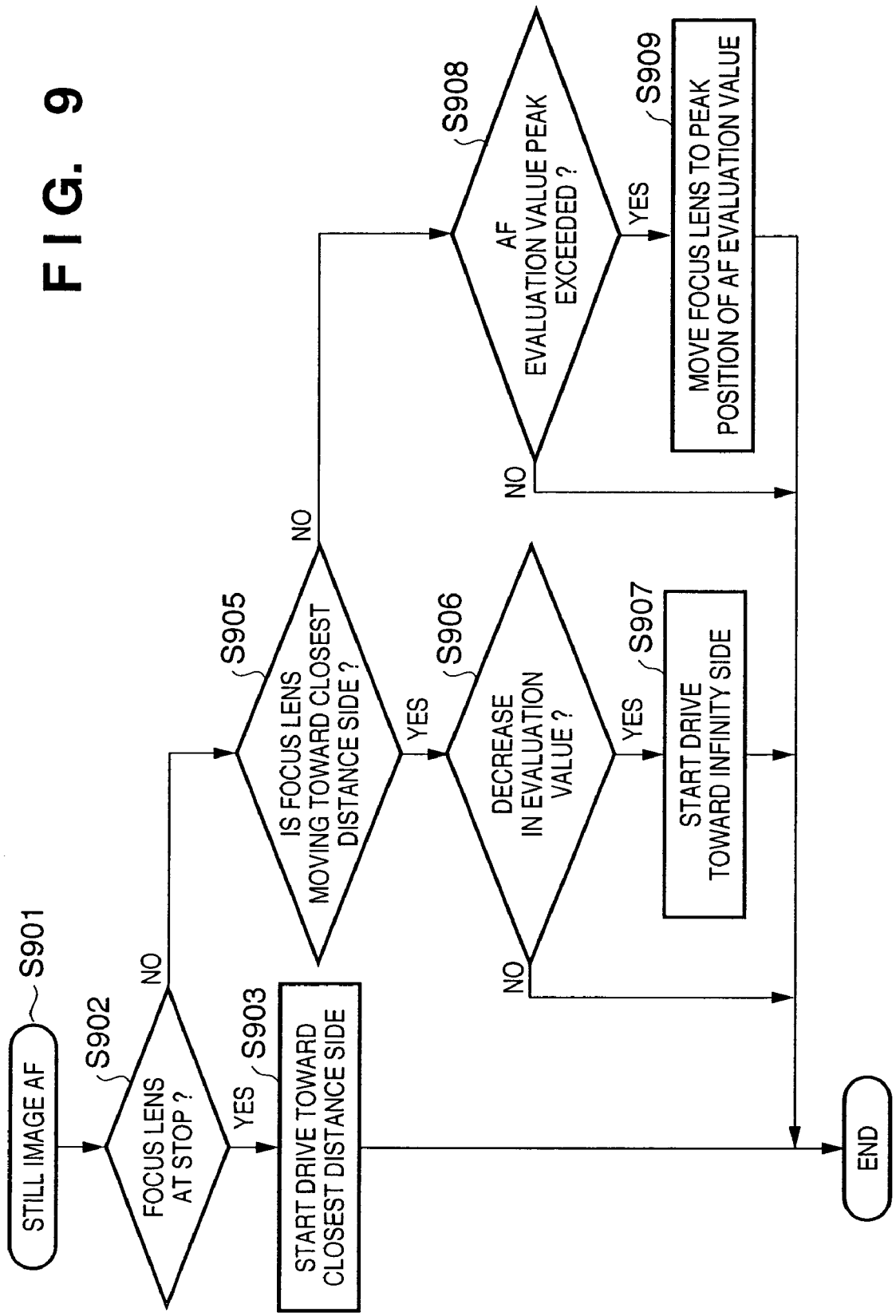
FIG. 9 is a flow chart associated with a still image AF process according to the embodiment of the present invention.

The process in FIG. 9 explains the still image AF process in step S806 in FIG. 8. Step S901 indicates the start of the process. It is determined in step S902 whether or not the focus lens 105 is at a stop. If it is determined in step S902 that the focus lens 105 is at a stop, the flow advances to step S903. In step S903, the focus lens begins to be driven toward the closest distance side, thus ending the current process.

If it is determined in step S902 that the focus lens is moving, the flow advances to step S905 to check if the focus lens 105 is moving toward the closest distance side. If it is determined in step S905 that the focus lens 105 is moving toward the closest distance side, the flow advances to step S906. In step S906, the AF evaluation value is monitored. If the AF evaluation value is decreased, the flow advances to step S907. In step S907, the focus lens begins to be driven toward the infinity side, thus ending the current process. If it is determined in step S906 that the AF evaluation value is not decreased, the current process directly ends.

If it is determined in step S905 that the focus lens 105 is moving toward the infinity side, the flow advances to step S908. In step S908, a change in AF evaluation value is monitored. If the AF evaluation value has exceeded a peak, the flow advances to step S909. In step S909, the focus lens is moved to and stopped at a focus lens position at which the peak of the AF evaluation value is detected in step S908, thus ending the still image AF process. If it is determined in step S908 that the AF evaluation value has not exceeded a peak, the current process ends. In this way, the peak of the AF evaluation value can be detected at high speed.

As described above, during monitoring before sensing an image, the focus lens is controlled to smoothly maintain an in-focus state. Upon depression of the release switch 114, the focus lens 105 is controlled to reach an in-focus position at high speed, thereby AF control operations suited to individual situations are executed.

The full-stroke state of the release switch 114 for sensing a still image is detected only after the half-stroke state. For this reason, if an AF search operation starts immediately after detection of the half-stroke state, a blurred image is recorded if the release switch 114 is immediately pressed to its full-stroke position. To solve this problem, the control may wait for a predetermined period of time after detection of the half-stroke state, and the AF search operation may start after it is confirmed that the release switch is not pressed to its full-stroke position. However, with this control, since the AF search operation cannot start immediately after detection of the half-stroke state, the AF in-focus time is prolonged.

Figure 10:
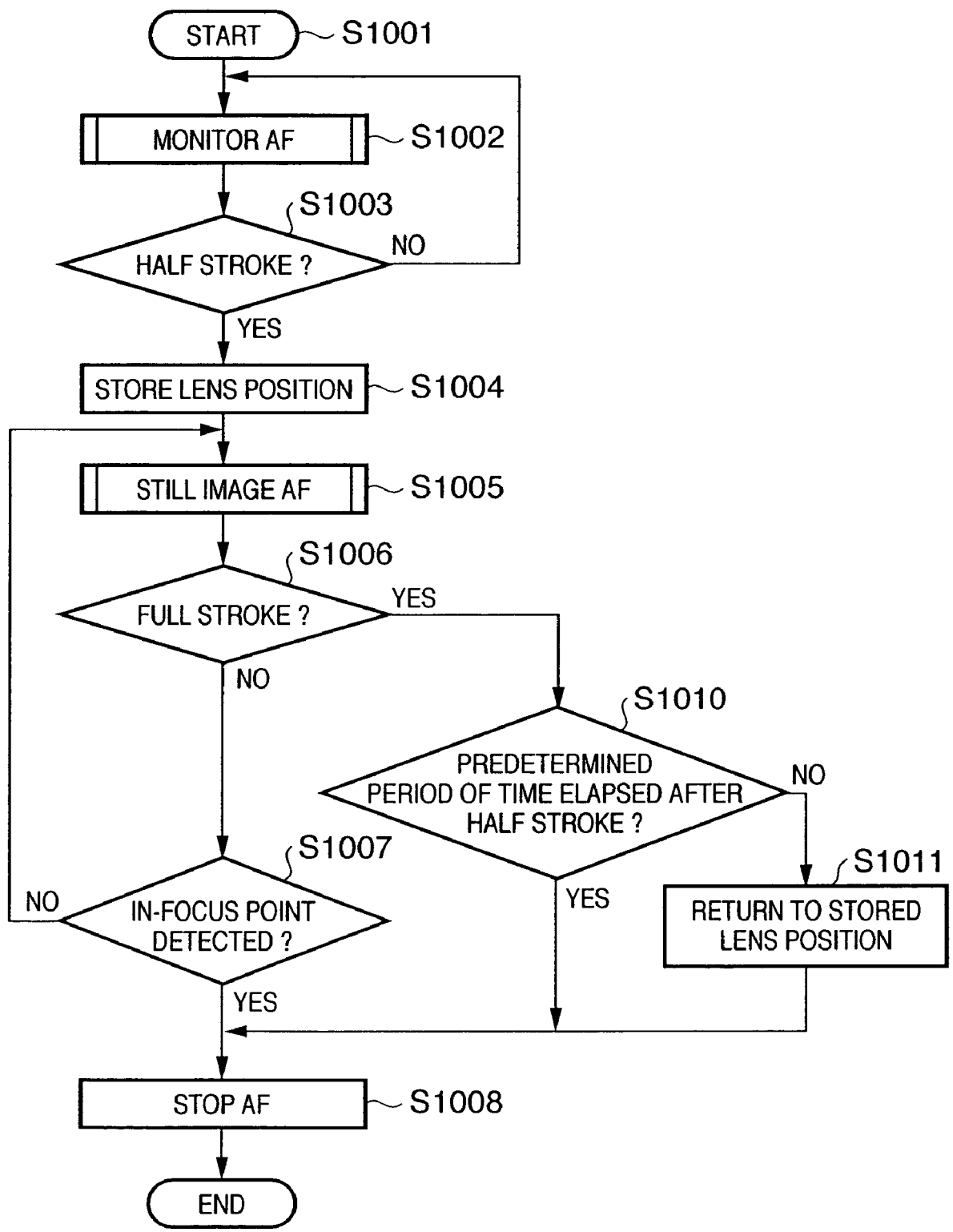
FIG. 10 is a flow chart associated with an AF operation in sensing a still image according to the embodiment of the present invention.

The control of the camera AF microcomputer according to the present invention will be described in detail below using FIG. 10. This process is executed by the AF microcomputer 113. Step S1001 indicates the start of the process. Step S1002 corresponds to the aforementioned monitor AF process. In step S1003, the release switch 114 is monitored. If the release switch 114 has not been pressed to its half-stroke position, the flow returns to step S1002 to continue to the monitor AF process. If the release switch 114 has been pressed to its half-stroke position, the flow advances to step S1004. In step S1004, the current focus lens position is stored in a memory in the AF microcomputer 113.

In step S1005, the aforementioned still image AF process is executed. It is checked in step S1006 if the release switch has been pressed to its full-stroke position. If the release switch has not been pressed to its full-stroke position, the flow advances to step S1007. It is checked in step S1007 if an in-focus point is detected. If an in-focus point is not detected, the flow returns to step S1005 to continue the still image AF process. If an in-focus point is detected, the flow advances to step S1008 to stop the AF process.

If it is determined in step S1006 that the release switch has been pressed to its full-stroke position, the flow advances to step S1010 to determine whether or not a predetermined period of time has elapsed after detection of the half-stroke state. This predetermined period of time is experimentally determined based on time periods detected as the half-stroke state upon depressing the release button to its full-stroke position. If the predetermined period of time has not elapsed yet, it is determined that the user originally wants to press the release switch to its full-stroke position, and the focus lens 105 is returned to the focus lens position stored in the microcomputer 113, since the focus lens position at the beginning of depression of the release switch 114 is optimal. On the other hand, if the release switch 114 has been pressed to its full-stroke position after an elapse of the predetermined period of time or more, it is determined that the user wants to capture the current image, and the focus lens 105 is stopped at the current focus lens position.

In this way, since the AF search operation can start immediately after detection of the half-stroke state in accordance with the release switch 114 for sensing a still image, the AF in-focus time can be shortened. When the full-stroke state is detected within a predetermined period of time after detection of the half-stroke state, it is determined that the user originally wants to press the release switch to its full-stroke position, and the focus lens 105 is returned to the focus lens position saved at the beginning of the AF process. In this way, the AF search operation can be prevented from being erroneously started in response to detection of the half-stroke state on the ways to the full-stroke position and, hence, a blurred image can be prevented from being captured during the search operation. Hence, an appropriate image can be recorded, and the image sensing time can be effectively shortened.

The present invention is not limited to the above embodiments and various changes and modifications can be made within the spirit and scope of the present invention. Therefore to apprise the public of the scope of the present invention, the following claims are made.

What is claimed is:

1. A focus adjustment apparatus, which attains focus adjustment by extracting, as a focal point voltage, a predetermined frequency component of a video signal obtained from an image sensor upon sensing an image of an object, and moving a focus adjustment member in an optical axis direction using a moving unit to maximize the focal point voltage, comprising:
    a detector that detects two input states including a first input state, and a second input state which is set via the first input state;
    a controller that executes focus adjustment control for the first input state upon detection of the first input state, and selectively enables or disables the focus adjustment control for the first input state in accordance with a time elapsed from detection of the first input state until detection of the second input state, upon detection of the second input state; and
    a storage unit, wherein when the first input state is detected, said controller saves a position of the focus adjustment member at that time in said storage unit, and executes the focus adjustment control for the first input state, and when the second input state is detected, said controller disables the focus adjustment control for the first input state when a predetermined period of time has not elapsed from detection of the first input state until detection of the second input state, and moves the focus adjustment member to the position of the focus adjustment member saved in said storage unit.

2. The apparatus according to claim 1, wherein when the predetermined period of time has elapsed from detection of the first input state until detection of the second input state, said controller enables the focus adjustment control for the first input state, and stops the focus adjustment member at a position of the focus adjustment member at the time of detection of the second input state.

3. A focus adjustment method, which attains focus adjustment by extracting, as a focal point voltage, a predetermined frequency component of a video signal obtained from an image sensor upon sensing an image of an object, and moving a focus adjustment member in an optical axis direction using a moving unit to maximize the focal point voltage, comprising:
    monitoring a first input state of an input unit which can input two input states including the first input state, and a second input state which is set via the first input state;
    executing focus adjustment control for the first input state upon detection of the first input state; monitoring the second input state;
    selectively enabling or disabling the focus adjustment control for the first input state in accordance with a time elapsed from detection of the first input state until detection of the second input state, upon detection of the second input state; and
    saving, when the first input state is detected, a position of the focus adjustment member at that time, wherein when a predetermined period of time has not elapsed from detection of the first input state until detection of the second input state, the focus adjustment control for the first input state is disabled, and the focus adjustment member is moved to the saved position of the focus adjustment member.

4. The method according to claim 3, wherein when the predetermined period of time has elapsed from detection of the first input state until detection of the second input state, the focus adjustment control for the first input state is enabled, and the focus adjustment member is stopped at a position of the focus adjustment member at the time of detection of the second input state.

5. An image sensing apparatus comprising: an image sensor that senses an image of an object and outputs an image signal; and the focus adjustment apparatus according to claim 1.

6. An image sensing apparatus which performs focus adjustment by the focus adjustment method according to claim 3.

* * * * *